US012093528B2

(12) United States Patent
Chandrasekaran et al.

(10) Patent No.: US 12,093,528 B2
(45) Date of Patent: Sep. 17, 2024

(54) SYSTEM AND METHOD FOR MANAGING DATA ACCESS IN DISTRIBUTED SYSTEMS

(71) Applicant: Dell Products L.P., Round Rock, TX (US)

(72) Inventors: Balasubramanian Chandrasekaran, Austin, TX (US); Dharmesh M. Patel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 131 days.

(21) Appl. No.: 18/160,485

(22) Filed: Jan. 27, 2023

(65) Prior Publication Data

US 2024/0256126 A1   Aug. 1, 2024

(51) Int. Cl.
 *G06F 12/00* (2006.01)
 *G06F 3/06* (2006.01)

(52) U.S. Cl.
 CPC ............ *G06F 3/0607* (2013.01); *G06F 3/061* (2013.01); *G06F 3/0619* (2013.01); *G06F 3/0631* (2013.01); *G06F 3/065* (2013.01); *G06F 3/0683* (2013.01)

(58) Field of Classification Search
 CPC ...... G06F 3/0607; G06F 3/061; G06F 3/0619; G06F 3/0631; G06F 3/065; G06F 3/0683
 See application file for complete search history.

(56) References Cited

U.S. PATENT DOCUMENTS

| | | | | |
|---|---|---|---|---|
| 11,226,847 B2* | 1/2022 | Alluboyina | ............ | G06F 9/4881 |
| 11,336,567 B2* | 5/2022 | Nainar | .................... | H04L 45/38 |
| 11,531,474 B1* | 12/2022 | Matsushita | ........... | G06F 3/0619 |
| 12,032,855 B2* | 7/2024 | Mitkar | .................. | G06F 3/0659 |
| 2021/0072966 A1* | 3/2021 | Zong | ...................... | H04L 67/60 |
| 2022/0138153 A1* | 5/2022 | Yelheri | ................. | G06F 9/5011 |
| | | | | 707/649 |
| 2022/0229734 A1* | 7/2022 | Seela | .................. | G06F 11/1451 |
| 2024/0036759 A1* | 2/2024 | Dailey | .................. | G06F 3/0614 |
| 2024/0069970 A1* | 2/2024 | Pottlapelli | ............ | G06F 9/5027 |

OTHER PUBLICATIONS

"A Guide to Deploying Machine Learning Models on Kubernetes," Seldon Technologies, Jan. 2, 2022 (8 Pages).
"Vertical Pod autoscaling," Google Cloud, Web Page https://cloud.google.com/kubernetes-engine/docs/concepts/verticalpodautoscaler accessed on Sep. 11, 2022 (10 Pages).
"Scaling Triton Inference Server," Nvidia, 2022, Web Page <https://docs.nvidia.com/ai-enterprise/natural-language/0.1.0/scaling.html> (17 Pages).

(Continued)

*Primary Examiner* — John A Lane
(74) *Attorney, Agent, or Firm* — Womble Bond Dickinson (US) LLP

(57) ABSTRACT

Methods and systems for providing computer implemented services using pods are disclosed. To provide the computer implemented services, instances of the pods may be deployed to data processing systems. When a new instance of a pod is created, a volume for the pod may be established. To select where to create instances of pods, locations where data access conflicts are less likely to arise may be selected. These locations may be identified based on the locations of pods and data access patterns for the pods.

20 Claims, 11 Drawing Sheets

(56) References Cited

OTHER PUBLICATIONS

Sharma, Girish, "How to Autoscale Kubernetes PodsBased on GPU," Private AI, May 31, 2022, Web Page <https://www.private-ai.com/2022/05/31/how-to-autoscale-kubernetes-pods-based-on-gpu/> (16 Pages)

Rattihalli, Gourav et al. "Exploring potential for non-disruptive vertical auto scaling and resource estimation in kubernetes." 2019 IEEE 12th International Conference on Cloud Computing (Cloud). IEEE, 2019. (8 Pages).

* cited by examiner

SYSTEM AND METHOD FOR MANAGING DATA ACCESS IN DISTRIBUTED SYSTEMS

FIELD

Embodiments disclosed herein relate generally to operation management. More particularly, embodiments disclosed herein relate to systems and methods to manage deployment of pods and replicas of volumes used by pods.

BACKGROUND

Computing devices may provide computer implemented services. The computer implemented services may be used by users of the computing devices and/or devices operably connected to the computing devices. The computer implemented services may be performed with hardware components such as processors, memory modules, storage devices, and communication devices. The operation of these components and the components of other devices may impact the performance of the computer implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for providing computer implemented services using pods. To provide the computer implemented services, instances of the pods may be dynamically instantiated and decommissioned over time.

The pods may be hosted by any number of data processing systems. To select where to deploy new instances of pods, an orchestrator or other type of management entity may analyze the data access patterns of pods over time. The orchestrator may select a deployment location for new instances of the pods in a manner that reduces the likelihood of data access restrictions impacting the operation of the pods (e.g., both existing and new instances).

To select the deployment location, the orchestrator may preferentially select data processing systems that do not host instances of similar types of pods, and that do not host volumes or replicas of volumes likely to be utilized by the new pod instances. Once deployed, new volumes for use by the new pod instances may be automatically instantiated. By selecting the deployment location in this manner, the likelihood of two volumes with similar data access patterns by pods may be less likely to be collocated in the same storages. Consequently, data access limits due to read or rate speeds may be less likely to reduce the rate of data access for the replicated volume. Accordingly, once instantiated, the operation of the newly instantiated pod may be less likely to be negatively impacted by data access limitations.

By doing so, a system in accordance with embodiments disclosed herein may provide for dynamic deployment of pods that are more likely to be of higher performance. For example, the deployed pod instances may be more likely to have sufficient rates of data access such that the operation of the pods instances are not limited due to data access. Accordingly, embodiments disclosed here may address, among other problems, the technical problem of data access limitations. By preferentially selecting deployment locations for pod instances to avoid collocation of volumes having similar access patterns, access limits due to the underlying storage media may be less likely to limit the operation of the pods. Accordingly, a data processing system in accordance with embodiments disclosed herein may more efficiently marshal limited computing resources by improving (e.g., flattening) the distribution of data access over time.

In an embodiment, a method for providing computer implemented services using pods of containers is provided. The method may include obtaining, by an orchestrator tasked with managing the pods, a data access pattern for a volume used by an instance of a pod of the pods; obtaining, by the orchestrator, a request for a new instance of the pod; identifying, by the orchestrator and based on the request, a first data processing system that hosts the volume; selecting, by the orchestrator, a second data processing system that does not host the volume or any instances of the pod that have utilized the volume; deploying, by the orchestrator, the new instance of the pod to the second data processing system; instantiating, by the orchestrator, a replica for the volume in storage of the second data processing system; and initiating, by the orchestrator, operation of the new instance of the pod using the replica for the volume.

The method may also include instantiating, by the orchestrator, a second replica for the volume in storage of the second data processing system. The replica and the second replica may store an erasure coded version of data of the volume, and the operation of the new instance of the pod is also initiating using the second replica for the volume.

Instantiating the replica for the volume may include initiating, by the orchestrator, a transfer of at least a portion of data of the volume to the second data processing system via a remote direct memory access data transfer.

Selecting the second data processing system may include discriminating a portion of data processing systems from all data processing systems available to host the pods based on data access patterns for all instances of the volume; and selecting the second data processing system from the data processing systems based on computing resource availability.

The new instance of the pod may include a container, and the container may host an application that provides a portion of computer implemented services provided by the pod.

During operation of the new instance of the pod, the application may use data stored in the replica of the volume to provide the computer implemented services, and the operation of the new instance of the pod does not use data of the volume.

The second data processing system may not host any instance of the pod that have used any replicas of the volume.

In an embodiment, a non-transitory media is provided. The non-transitory media may include instructions that when executed by a processor cause the computer implemented method to be performed.

In an embodiment, a data processing system is provided. The data processing system may include the non-transitory media and a processor, and may perform the computer implemented method when the computer instructions are executed by the processor.

Turning to FIG. 1, a block diagram illustrating a system in accordance with an embodiment is shown. The system shown in FIG. 1 may provide computer implemented services. The computer implemented services may include any type and quantity of computer implemented services. For example, the computer implemented services may include data storage services, instant messaging services, database services, and/or any other type of service that may be implemented with a computing device.

To provide the computer implemented services, the system may include any number of data processing systems 100. Data processing systems 100 may provide the computer implemented services to users of data processing systems 100 and/or to other devices (not shown). Different data processing systems may provide similar and/or different computer implemented services.

To provide the computer implemented services, data processing systems 100 may include various hardware components (e.g., processors, memory modules, storage devices, etc.) and host various software components (e.g., operating systems, application, startup managers such as basic input-output systems, etc.). These hardware and software components may provide the computer implemented services via their operation.

The software components may be implemented using containers, and pods of containers that may share a same context (e.g., have access to shared hardware resources such as shared storage, shared network resources, etc.). The containers may include any number of applications and support services (e.g., dependencies, such as code, runtime, system libraries, etc.) for the applications. The applications may independently and/or cooperatively provide the computer implemented services.

In general, embodiments disclosed herein may provide methods, systems, and/or devices for providing computer implemented services using pods of containers. To provide the computer implemented services, pods may be dynamically deployed. When deployed, the new instances of the pods may provide various types of computer implemented services. The new instances of the pods may be deployed, for example, in response to changes in demand for various computer implemented services.

When operating, the applications hosted by the containers of the pods may generate new data and need to access previously stored data. To do so, various portions of storage resources of a data processing system may be dedicated for use by the pods. For example, a volume (e.g., an identifiable portion of storage resources, such as all of the storage space of a storage device, or a portion of the storage space, or some store space from multiple storage devices, etc.) may be allocated for user by a pod thereby allowing the applications to store and access stored data.

To provide different instances of pods with access to data, replicas of volumes may be established for each instance of a type of a pod. By doing so, any number of pods may have access to similar but independent instances of a volume. Accordingly, storage access for the pods may not be restricted based on access restrictions to volumes.

However, if multiple instances of a type of a pod are instantiated and use two instances of a volume (e.g., an original and a replica) stored in the same storage, then access to the data stored in the instances of the volume may be restricted due to colocation of the volumes in the same storage. For example, due to similarities between the operation of instances of a pod, the instances may have similar data access behavior (e.g., may tend to write/read at similar times). If the data access behavior of the instances, in aggregate, exceeds the capabilities of the storage in which the instances of the volume are stored, then access to the data may be restricted due to the capability limitations.

To reduce the likelihood of instances of pods being impacted by access restrictions due to capability limitations of storages, the system of FIG. 1 may include orchestrator 104. Orchestrator 104 may (i) monitor data access patterns of instances of pods, (ii) deploy new instances of pods based on the data access patterns, and (iii) automatically initiate volume replication to facilitate operation of the instances of the pods. By doing so, newly deployed instances of pods may be less likely to face data access restrictions that may otherwise impair the ability of the newly deployed instances of the pods to provide desired computer implemented services. Refer to FIGS. 2A-2E for additional details regarding instantiation of new pods and volume replication.

When initiating volume replication, in the context of volumes stored with erasure coding or other data protection scheme, orchestrator 104 use the data access patterns to choose where to replicate portions of a volume (e.g., striped) so that the volume is less likely to be impacted by access restrictions. For example, orchestrator 104 may preferentially direct that the portions of a replicated volume be stored in storages of data processing systems that do not host instances of pods that have previously utilized the volume or any similar replicated volumes. Refer to FIGS. 2F-2H for additional details regarding replication of volumes stored with erasure coding or in accordance with other data protection schemes that distribute data across multiple fault domains.

Figure 3:
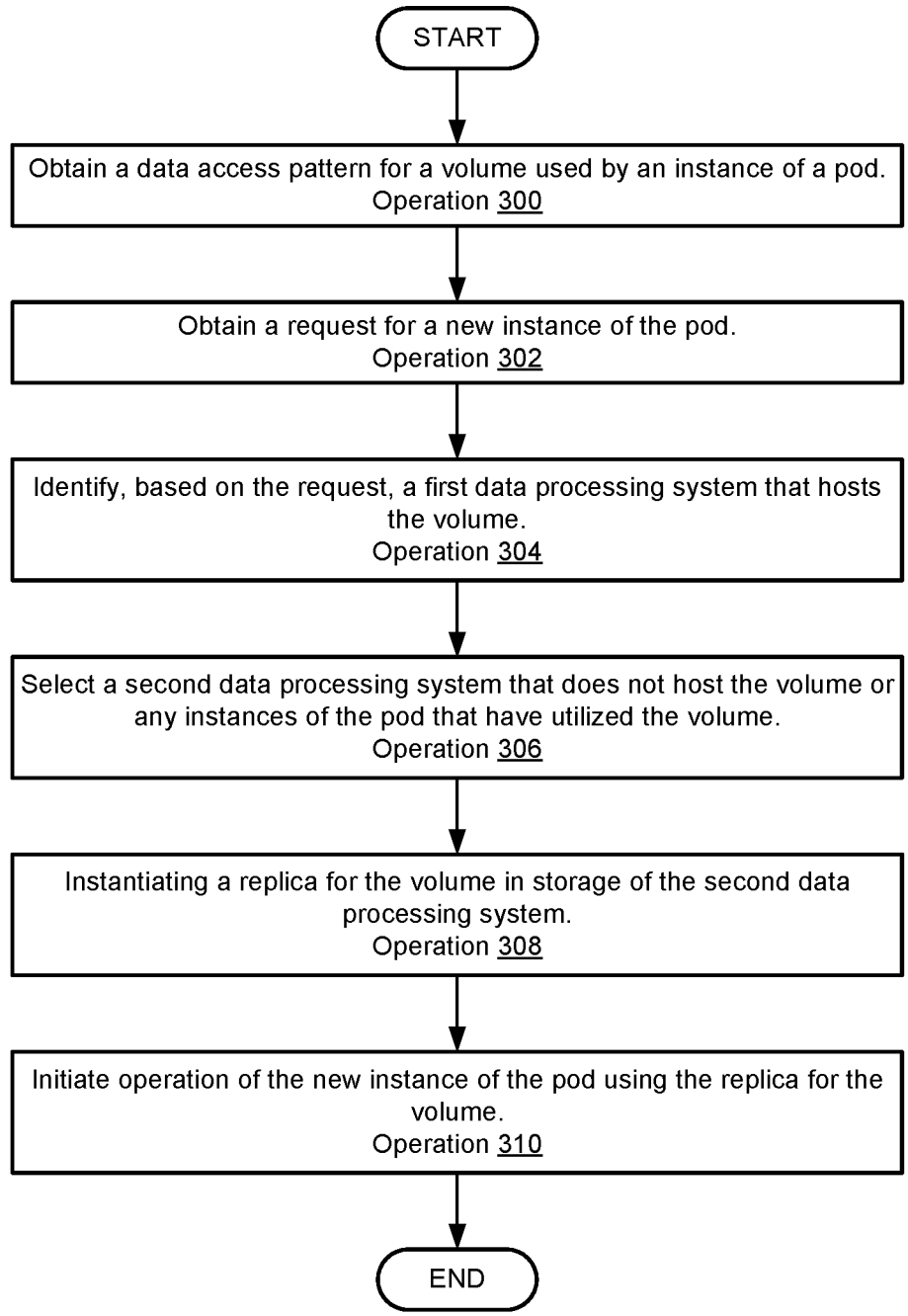
FIG. 3 shows a flow diagram illustrating a method of providing computer implemented services using pods in accordance with an embodiment.

When providing its functionality, data processing systems 100 and/or orchestrator 104 may perform all, or a portion, of the method illustrated in FIG. 3.

Any of data processing systems 100 and/or orchestrator 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

While illustrated in FIG. 1 as being separate from data processing systems 100, data processing systems 100 may perform the functionality of orchestrator 104 without departing from embodiments disclosed herein. For example, rather than being implemented with a separate device, the functionality of orchestrator 104 may be implemented with a distributed service hosted by all, or a portion, of data processing systems 100.

Any of the components illustrated in FIG. 1 may be operably connected to each other (and/or components not illustrated) with communication system 102. In an embodiment, communication system 102 includes one or more networks that facilitate communication between any number of components. The networks may include wired networks and/or wireless networks (e.g., and/or the Internet). The networks may operate in accordance with any number and types of communication protocols (e.g., such as the Internet Protocol).

While illustrated in FIG. 1 as including a limited number of specific components, a system in accordance with an embodiment may include fewer, additional, and/or different components than those illustrated therein.

To further clarify embodiments disclosed herein, diagrams illustrating data flows implemented by and data structures used by a system over time in accordance with an embodiment are shown in FIGS. 2A-2H.

Figure 2A:
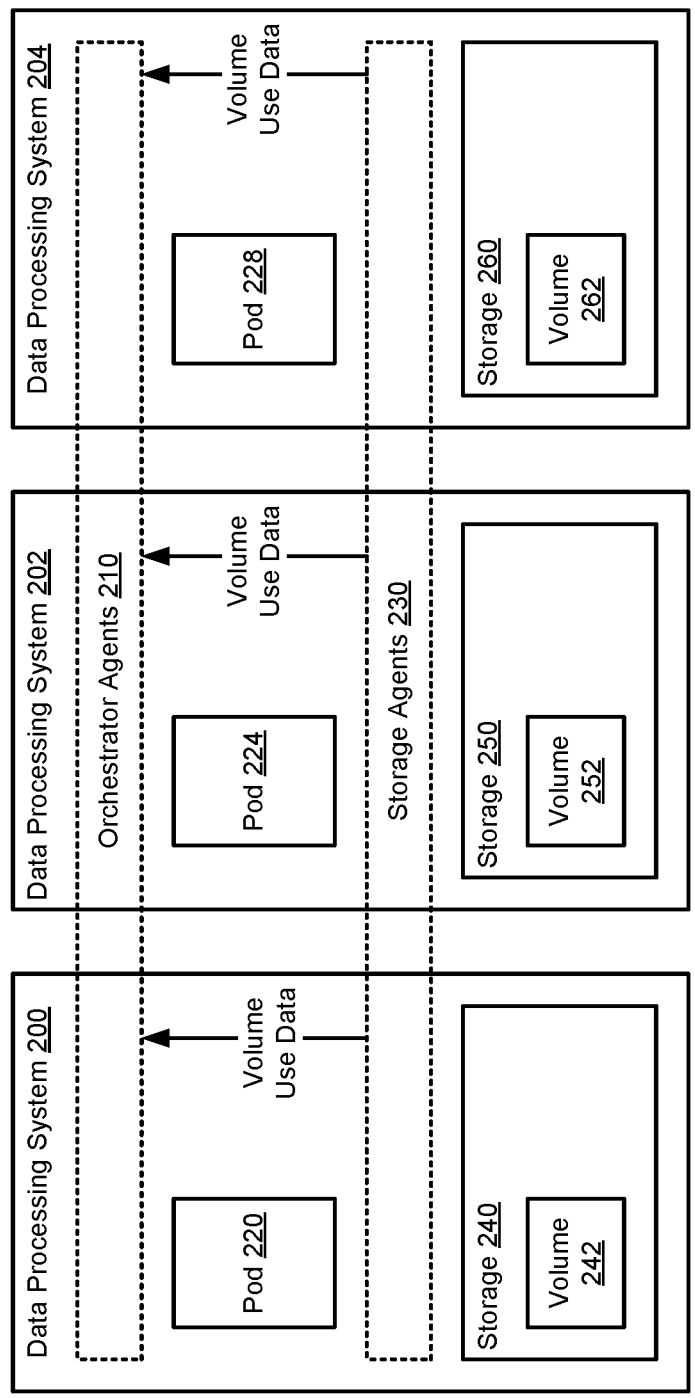
FIGS. 2A-2H show diagrams illustrating data flows, processes, and other aspects of a system in accordance with an embodiment.

Turning to FIG. 2A, a first data flow diagram illustrating data flows, data processing, and/or other operations that may be performed by the system of FIG. 1 in accordance with an embodiment is shown. In FIG. 2A, data processing systems 200-204 may be similar to data processing systems 100. Each of data processing systems 200-204 may host orchestrator agents 210 and storage agents 230. The orchestrator agents may provide the functionality of orchestrator 104.

The storage agents 230 may implement a management plane for storage resources of the data processing systems. The management plane may include functionality to (i) monitor access patterns of pods, (ii) instantiating volumes, (iii) replicate volumes, (iv) remove volumes, and/or perform other functions to manage the storage resources of the data processing systems. When replicating volumes, storage agents 230 may implement remote direct memory access (RDMA) to facilitate volume replication. For example, RDMA may support zero-copy networking which may allow network adapters of the data processing systems to transfer data directly from network to memory, and the reverse. Consequently, the data may not need to be buffered in management buffers (e.g., operating system data buffers) thereby eliminating (or greatly reducing) use of processors, caches, and/or context switches for volume replication.

To manage the pods (e.g., 220, 224, 228) hosted by data processing systems 200-204, the orchestrator (e.g., through orchestrator agents 210) may monitor use of volumes by various pods over time. For example, when providing its functionality, pod 220 may utilize volume 242. Pod and pod 228 may similarly use volume 252 and 262, respectively, during their operation. Though monitoring of the use of these volumes, the orchestrator may identify the data access patterns of the pods. The orchestrator may store information regarding these access patterns, such as associations between the pods and volumes.

The information may be stored in any format. For example, the information may be stored in a database, a linked list, a table, or any other type of data structure.

Figure 2B:
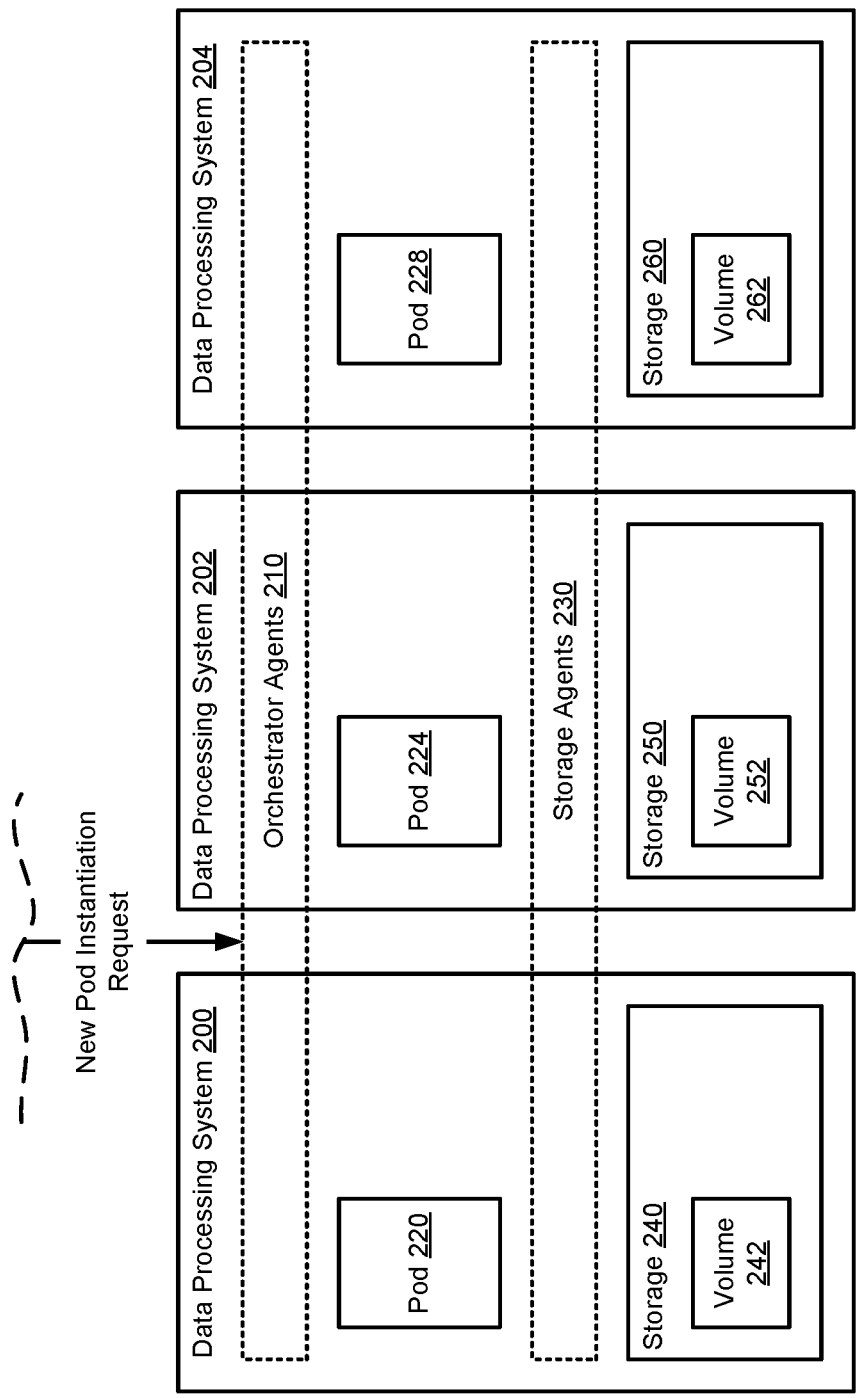

Turning to FIG. 2B, a second data flow diagram illustrating data flows, data processing, and/or other operations that may be performed by the system of FIG. 1 in accordance with an embodiment is shown.

Now consider a scenario, following collection of data access pattern information, that the orchestrator obtains a new pod instantiation request. The new pod instantiation request may indicate that a new instance of a pod is to be instantiated.

In FIG. 2B, this request is shown as being obtained from another device (the dashed, wavy line indicating that the other device is not shown). However, the new pod instantiation request may be generated by any of the data processing systems or an orchestrator. For example, the orchestrator may be tasked with instantiating new instances of pods in response to changes in workloads of the pods. The orchestrator may monitor the workloads of the pods and may instantiate new instances of the pods when workload criteria (e.g., thresholds) are met thereby facilitate distribution of the workload across greater numbers of pods. The orchestrator may similarly decommission pods dynamically based on workload levels. The orchestrator may instantiate new instances of pods for other reasons.

Once obtained, the orchestrator may determine where the new instance of the pod will be hosted. The orchestrator may do so based on the data access patterns.

To make the determination, the orchestrator may (i) identify the type of the pod, (ii) identify where existing instances of the pod are deployed and instances of the volume/replicas of the volumes are hosted, and (iii) select a deployment location so that multiple instances of a volume (e.g., original or replica) used by a similar type of pod are not hosted by the same data processing systems. By doing so, instances of the pod may be less likely to be impacted by access restrictions for data in instances of volumes used by the pods.

Figure 2C:
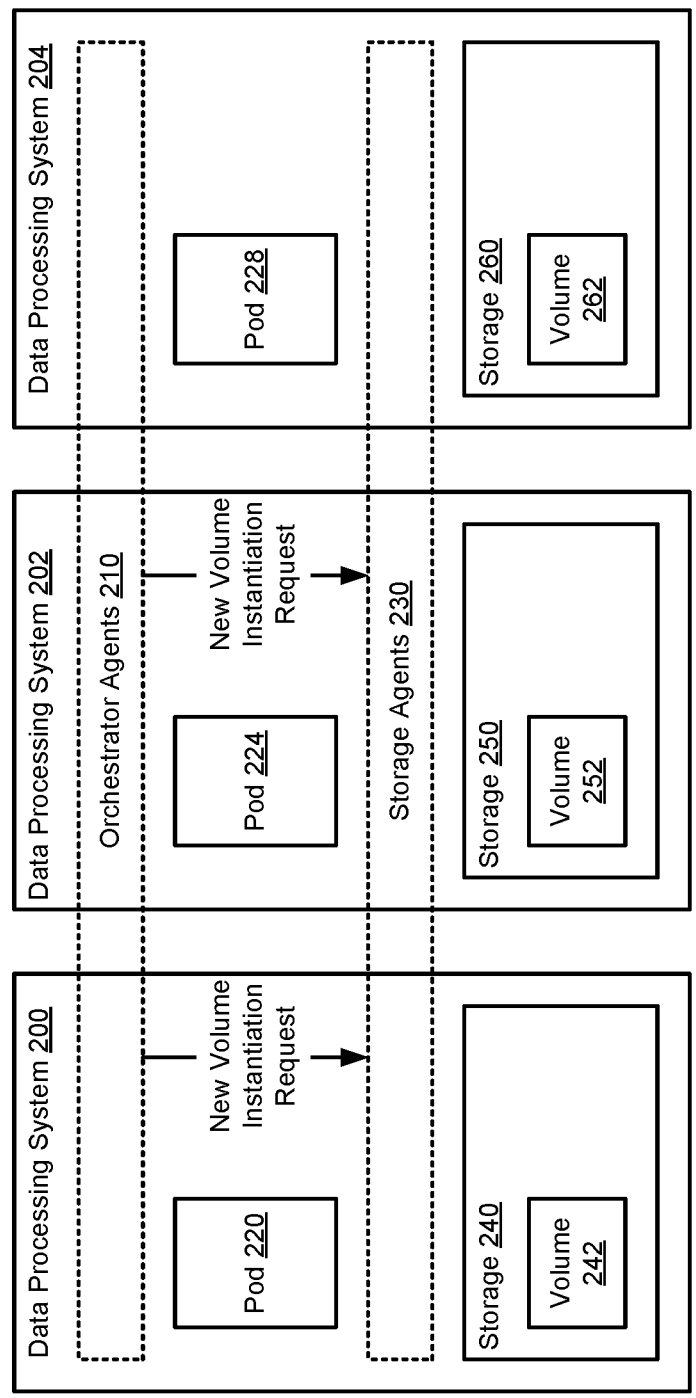

Turning to FIG. 2C, a third data flow diagram illustrating data flows, data processing, and/or other operations that may be performed by the system of FIG. 1 in accordance with an embodiment is shown.

Now consider a scenario in which the request is for a new instance of pod 220 which utilizes volume 242, and neither pod 224 nor pod 228 are instances of pods of the same type of pod as pod 220. In this scenario, the orchestrator may select either of data processing system 202 or data processing system 204. In this example scenario, data processing system 202 is selected.

Based on the selection, the orchestrator agents issue new volume instantiation requests to the storage agents hosted by data processing system 200 and data processing system 202 to replicate volume 242 to storage 250.

Figure 2D:
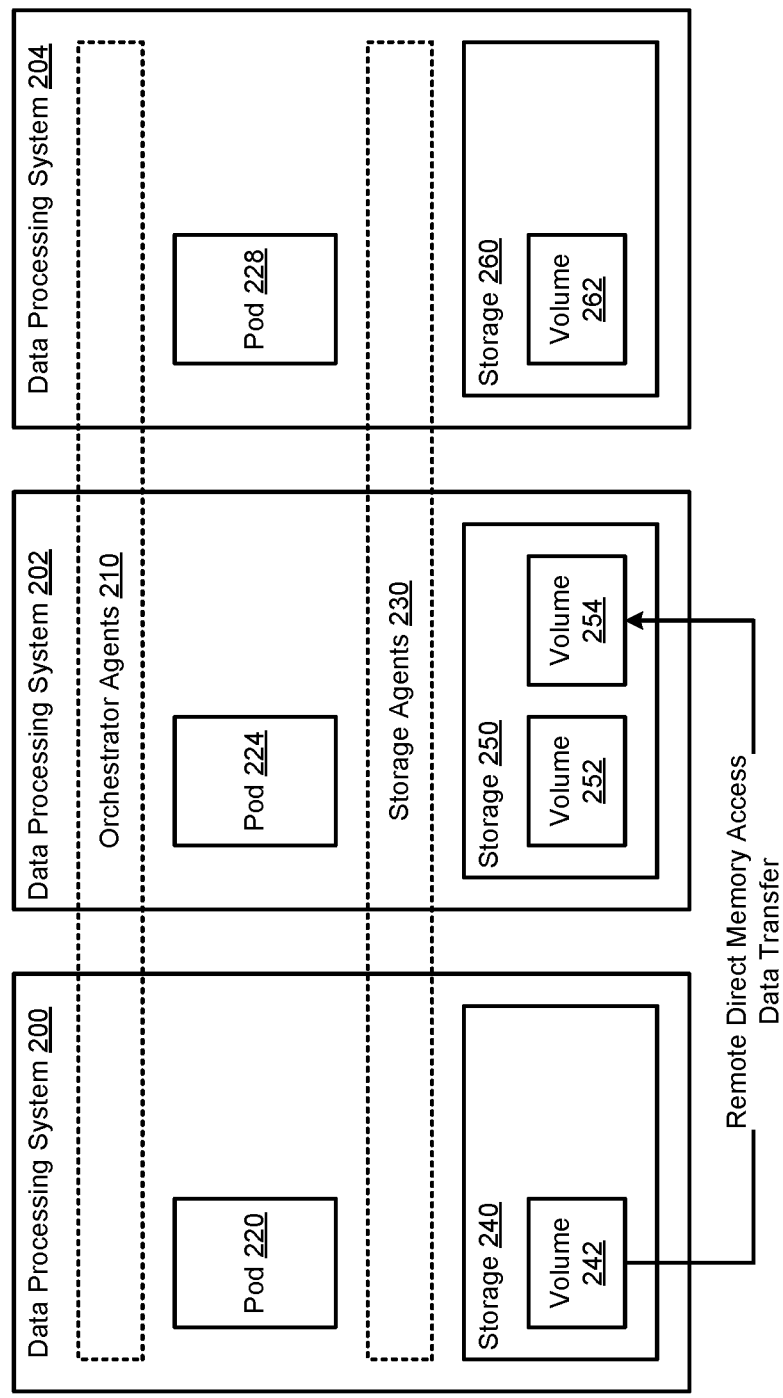

Turning to FIG. 2D, a fourth data flow diagram illustrating data flows, data processing, and/or other operations that may be performed by the system of FIG. 1 in accordance with an embodiment is shown.

Based on the requests, a RDMA data transfer is initiated by the storage agents to instantiate volume 254. Once instantiated, two instances of volume 242 may be available and hosted by different storage devices.

Figure 2E:
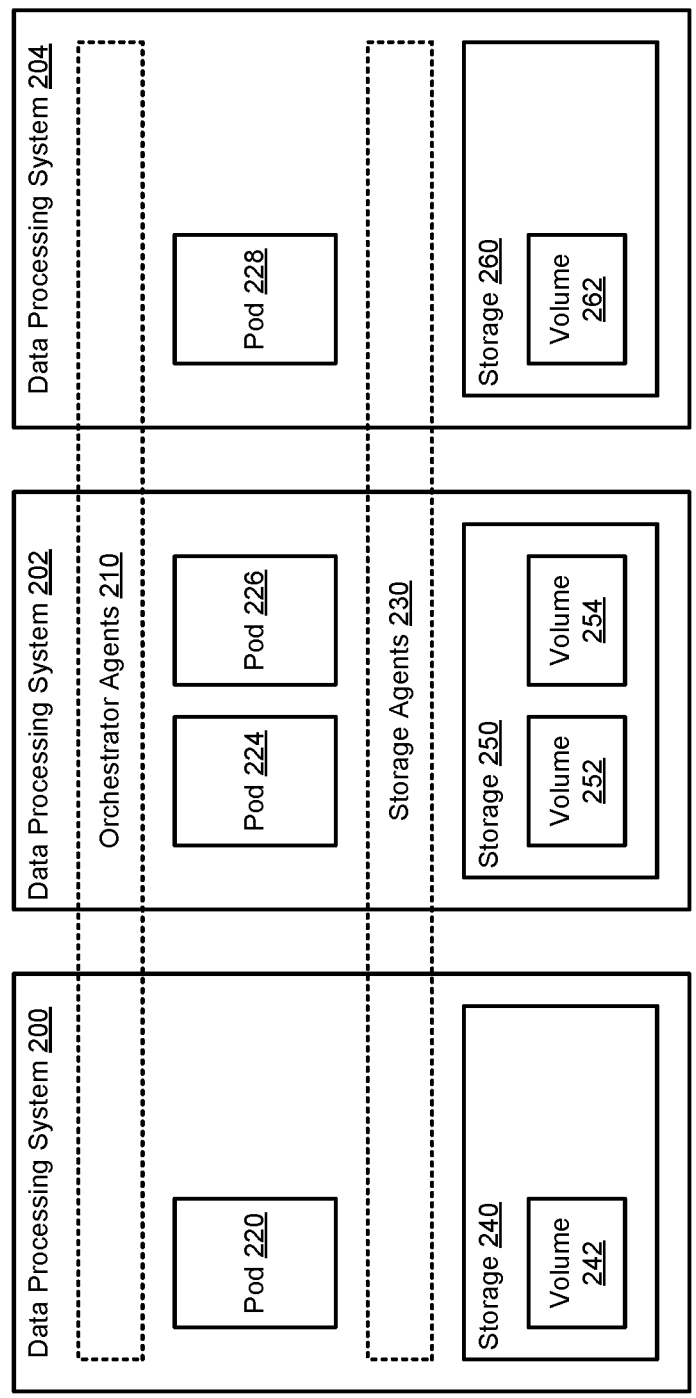
Figure 2F:
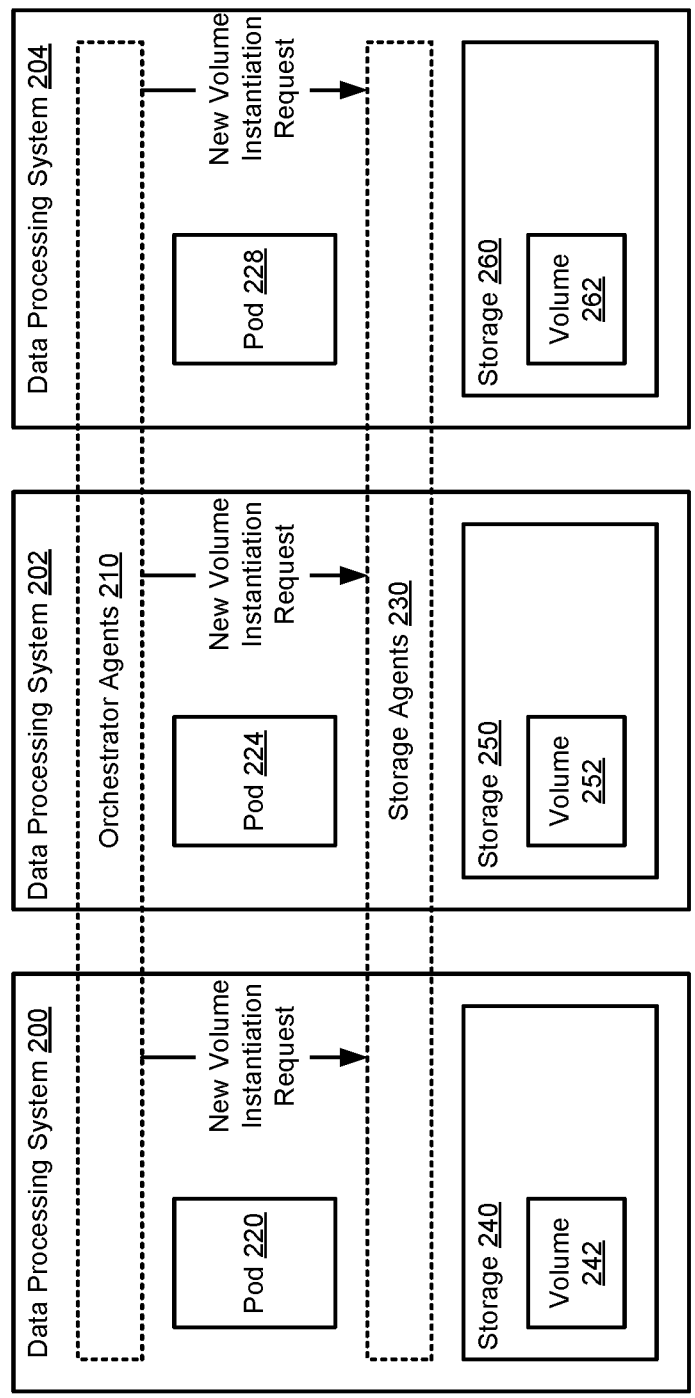
Figure 2G:
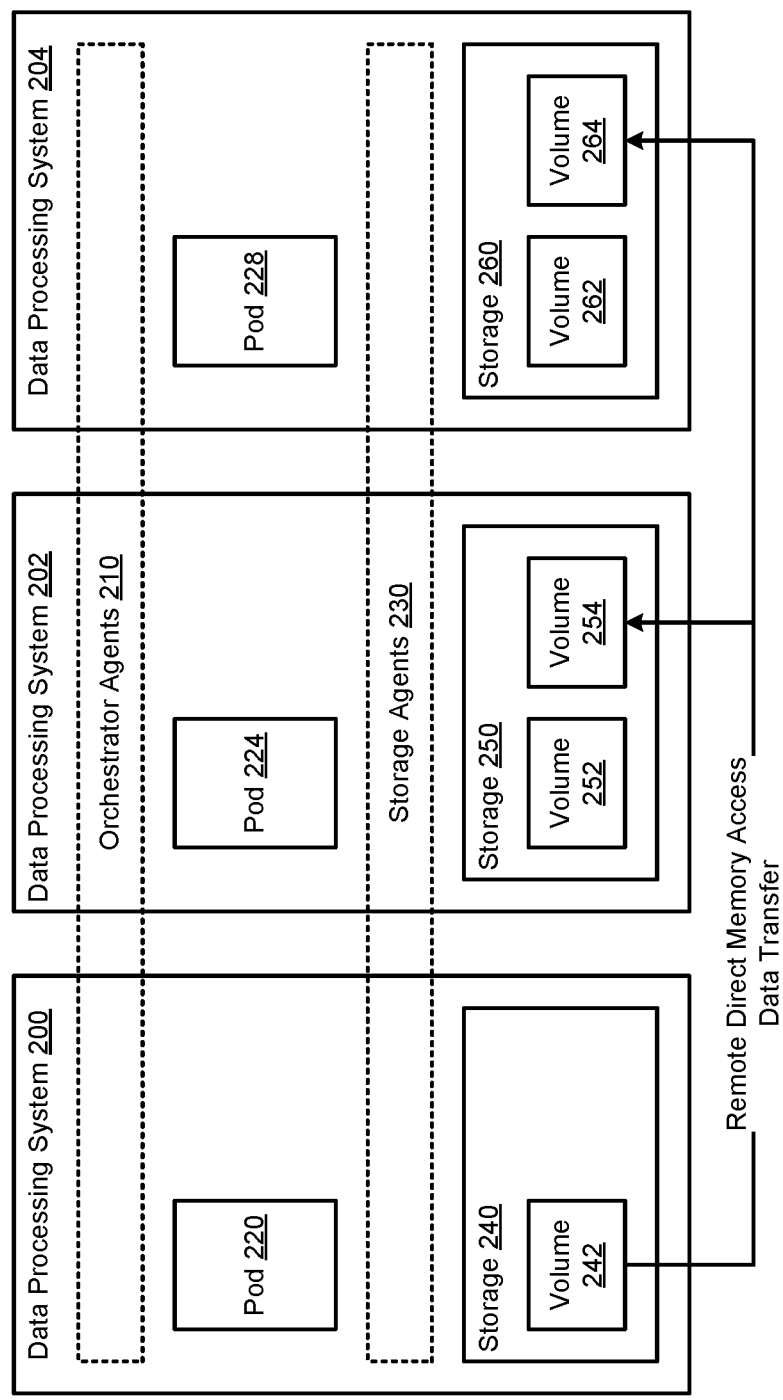
Figure 2H:
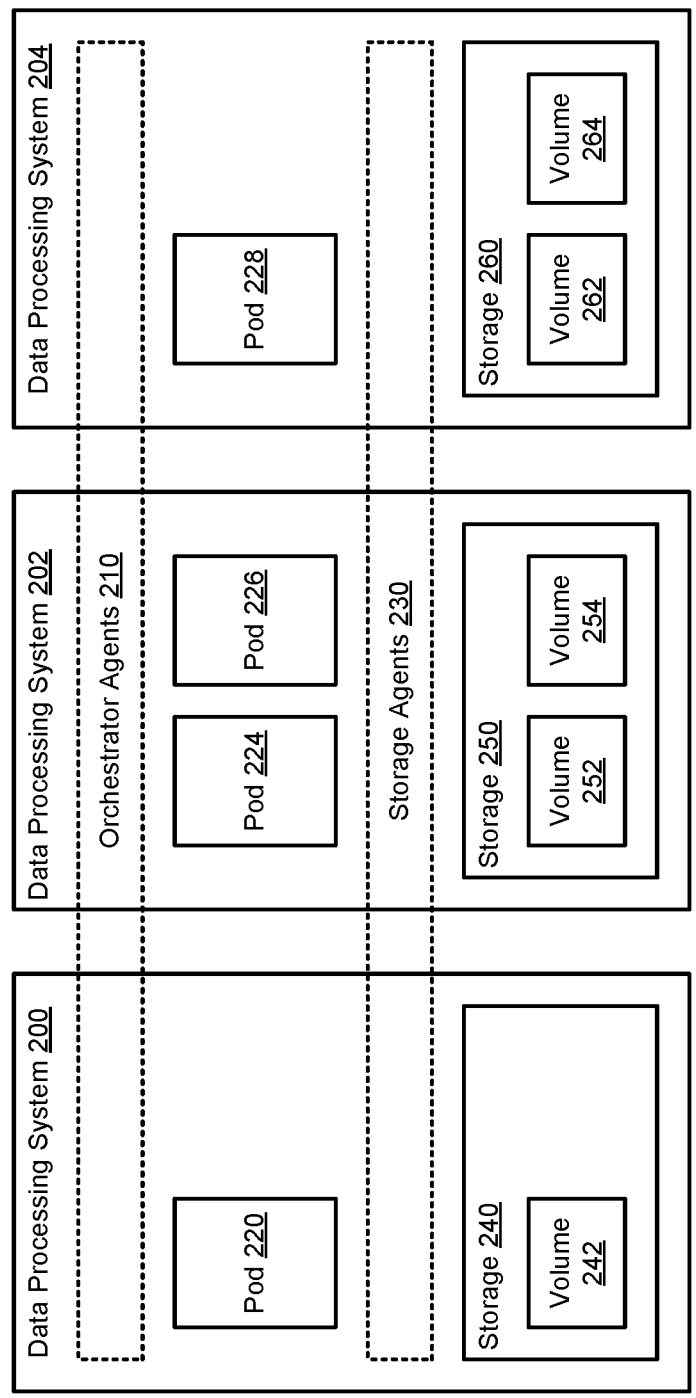

Turning to FIG. 2E, a fifth data flow diagram illustrating data flows, data processing, and/or other operations that may be performed by the system of FIG. 1 in accordance with an embodiment is shown.

Orchestrator may instantiate pod 226 based on the request. Pod 226 may be a new instance of the type of pod of pod 220. Once instantiated, pod 226 may being operation and utilize volume 254. Through this process, the capacity for services provided by pod 220 may be expanded without causing potential data access restrictions to be created.

Turning to FIG. 2F, a sixth data flow diagram illustrating data flows, data processing, and/or other operations that may be performed by the system of FIG. 1 in accordance with an embodiment is shown.

Now, consider a second scenario, following the operations described with respect FIG. 2B, where instead of instantiating a volume that does not include data processing features such as erasure coding, a volume does include data protection features that requires that a replication of the volume be striped across two data processing systems (e.g., to separate it across two fault domains).

In such a scenario, the orchestrator may identify that neither data processing system 202 nor data processing system 204 host instances of the volume. Accordingly, these data processing systems may be selected for replication of volume 242. To do so, in contrast to the operations shown in FIG. 2C, new volume instantiation requests may be sent to the storage agents of all three data processing systems 200-204.

Turning to FIG. 2G, a seventh data flow diagram illustrating data flows, data processing, and/or other operations that may be performed by the system of FIG. 1 in accordance with an embodiment is shown.

Based on the requests, a RDMA data transfer may be initiated to instantiate volume 254 and volume 264 (e.g., both portions of the replica of volume 242). These volumes may include, for example, erasure coding bits (e.g., parity bits) or other data usable to reconstruct data stored in the other volume should all, or a portion, of the data become inaccessible (e.g., due to corruption, data loss, etc.). While described with respect to striping across two data processing systems in FIG. 2G, this process may be expanded to any number of data processing systems (e.g., to support distribution of a replicated volume with data protection features across greater numbers of fault domains).

For example, in erasure coding, the data may be split into portions and additional portions with erasure coding bits may be established. The number of portions may dictate the number of fault domains across which the portions may need to be stored to facilitate recovery of inaccessible data.

Turning to FIG. 2H, an eighth data flow diagram illustrating data flows, data processing, and/or other operations that may be performed by the system of FIG. 1 in accordance with an embodiment is shown.

Once the replicated volume is established, a new pod instances (e.g., 226) may be instantiated on data processing system 202 or data processing system 204, and may begin to utilize the distributed replicated volume.

Any of the services (e.g., 210, 230) described with respect to FIGS. 2A-2H may be implemented using, for example, processes (e.g., executing code within a computing environment), containers that host instances of processes, and/or other architectures for implementing and combining different functionalities to provide a distributed service.

As discussed above, the components of FIG. 1 may perform various methods to provide computer implemented services using pods. FIG. 3 illustrates a method that may be performed by the components of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method for providing computer implemented services in accordance with an embodiment is shown. The method may be performed by components of the system shown in FIG. 1, and/or other components.

At operation 300, a data access pattern for a volume used by an instance of a pod is obtained. The data access pattern may be obtained by (i) identifying that the instance of the pod uses the volume and (ii) associating the volume and the type of the pod with a record. The record may be part of a data structure such as a database. An orchestrator may obtain the data access pattern.

The data access pattern may be obtained as part of monitoring of data access patterns by any numbers and types of pods deployed across data processing systems. The data base may store records indicating which volumes have been utilized by the different types of pods hosted by the data processing systems over time.

At operation 302, a request for a new instance of the pod is obtained. The request may be obtained by (i) receiving it from another entity or (ii) based on an occurrence of a condition meeting a criteria. The condition may be, for example, a level of workload imposed on instances of the pod, and the criteria may be, for example, a workload level threshold for existing instances of the type of the pod. In other words, if a workload of a pod of the type of the new instance of the pod is too great, then a new instance of the pod may be automatically set for instantiation to distribute the workload across a larger number of instances of the pod.

At operation 304, a first data processing system that hosts the volume is identified based on the request. The first data processing system may be identified, for example, by a performing a lookup in a data structure. The data structure may specify data processing systems that host instances of each type of pod. The lookup may return a list of data processing systems hosting the type of the pod. The first data processing system may be one of the listed data processing systems.

At operation 306, a second data processing system that does not host the volume or any instances of the pod that have utilized the volume is selected. The second data processing may be selected by (i) starting with a list of all data processing systems to which the new instance of the pod may be deployed, (ii) excluding the data processing systems that host instances of the type of the pod from the list (e.g., these data processing systems may have utilized the original or a replica of the volume, by excluding these only data processing systems that do not host the volume or replicas of the volume may remain), and (iii) selecting one of the remaining data processing systems.

If the replica of the volume is to be distributed across multiple data processing systems for data protection purposes, then multiple data processing systems may be selected. The selected multiple data processing systems may not host instances of the type of the pod or store portions of the volume or replicas of the volume.

At operation 308, a replica for the volume is instantiated in storage of the second data processing system. The replica may be instantiated by issuing one or more RDMA data transfers to establish the replica of the volume in the storage of the second data processing system.

If the replica of the volume is distributed, the RDMA data transfers may be between the data processing system hosting the to-be-replicated volume and the multiple data processing systems identified in operation 306.

At operation 310, operation of the new instance of the pod is initiated using the replica for the volume. The operation of the new instance of the pod may provide any type and quantity of computer implemented services.

The method may end following operation 310.

Using the method illustrated in FIG. 3, a system in accordance with an embodiment may be able to dynamically deploy instances of pods with reduced likelihood of the operation of the pods being impacted by undesired data access limits. For example, by proactively identify data access patterns of existing pods and selecting deployment locations for new instances of the pods based on the data access patterns, replicated volumes for the new instances of the pods may be less likely to be collocated with other volumes that are likely to be subject to similar access patterns. Consequently, the data access patterns of the volumes hosted by storage of a data processing system may be less likely to be limited by the storage devices used to implement the storage.

Figure 4:
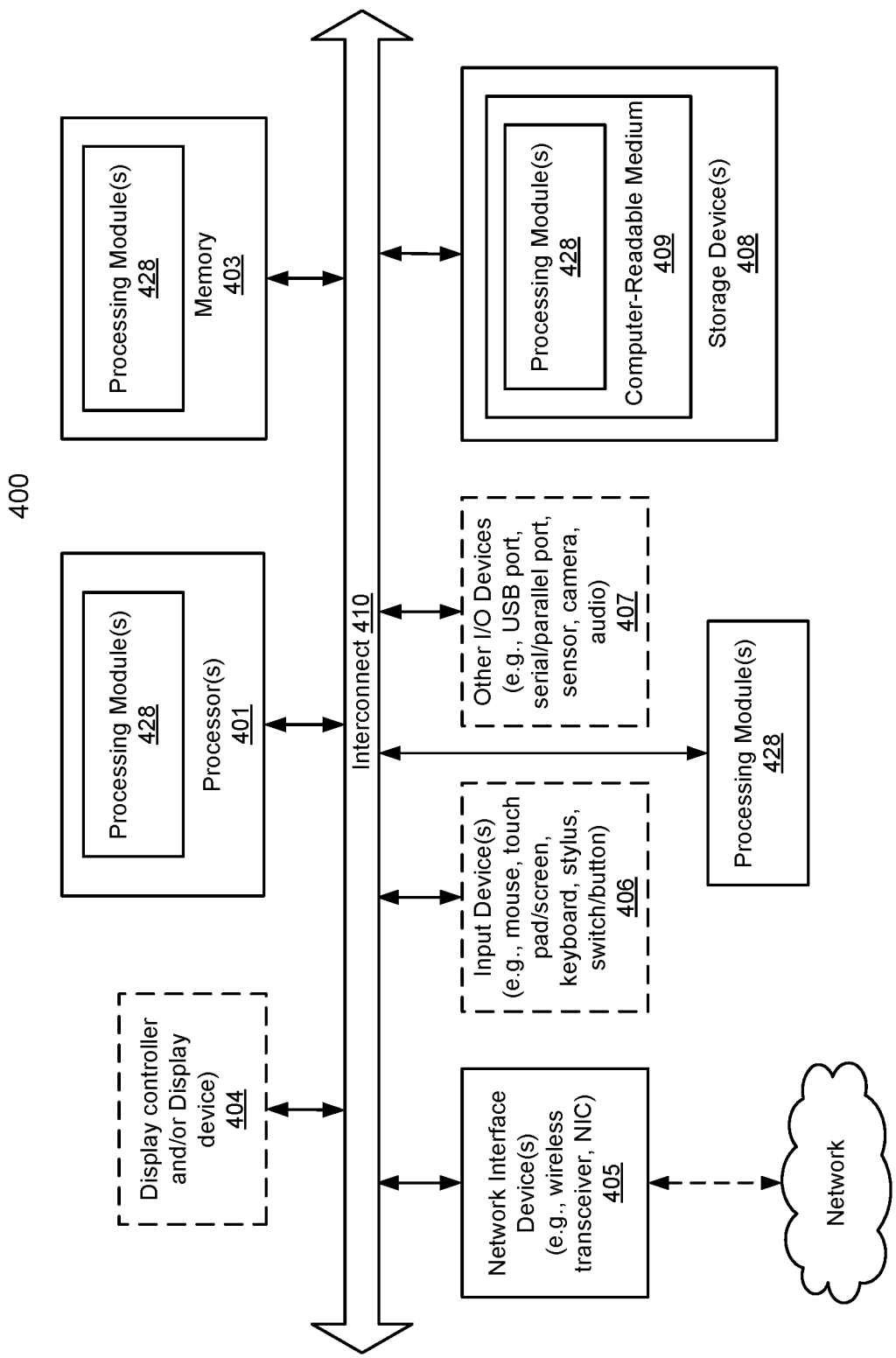
FIG. 4 shows a block diagram illustrating a data processing system in accordance with an embodiment.

Any of the components illustrated in FIGS. 1-2H may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OSR/iOS® from Apple, Android® from Google®, Linux, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/ logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for providing computer implemented services using pods of containers, the method comprising:
   obtaining, by an orchestrator tasked with managing the pods, a data access pattern for a volume used by an instance of a pod of the pods;
   obtaining, by the orchestrator, a request for a new instance of the pod;
   identifying, by the orchestrator and based on the request, a first data processing system that hosts the volume;
   selecting, by the orchestrator, a second data processing system that does not host the volume or any instances of the pod that have utilized the volume;
   deploying, by the orchestrator, the new instance of the pod to the second data processing system;
   instantiating, by the orchestrator, a replica for the volume in storage of the second data processing system; and
   initiating, by the orchestrator, operation of the new instance of the pod using the replica for the volume.

2. The method of claim 1, further comprising:
   instantiating, by the orchestrator, a second replica for the volume in storage of the second data processing system,
   wherein the replica and the second replica store an erasure coded version of data of the volume, and the operation of the new instance of the pod is also initiating using the second replica for the volume.

3. The method of claim 1, wherein instantiating the replica for the volume comprises:
   initiating, by the orchestrator, a transfer of at least a portion of data of the volume to the second data processing system via a remote direct memory access data transfer.

4. The method of claim 1, wherein selecting the second data processing system comprises:
   discriminating a portion of data processing systems from all data processing systems available to host the pods based on data access patterns for all instances of the volume; and
   selecting the second data processing system from the data processing systems based on computing resource availability.

5. The method of claim 1, wherein the new instance of the pod comprises a container, and the container hosts an application that provides a portion of computer implemented services provided by the pod.

6. The method of claim 5, wherein during operation of the new instance of the pod, the application uses data stored in the replica of the volume to provide the computer implemented services, and the operation of the new instance of the pod does not use data of the volume.

7. The method of claim 1, wherein the second data processing system does not host any instance of the pod that have used any replicas of the volume.

8. A non-transitory machine-readable medium having instructions stored therein, which when executed by a processor, cause the processor to perform operations for providing computer implemented services using pods of containers, the operations comprising:
   obtaining, by an orchestrator tasked with managing the pods, a data access pattern for a volume used by an instance of a pod of the pods;
   obtaining, by the orchestrator, a request for a new instance of the pod;
   identifying, by the orchestrator and based on the request, a first data processing system that hosts the volume;
   selecting, by the orchestrator, a second data processing system that does not host the volume or any instances of the pod that have utilized the volume;
   deploying, by the orchestrator, the new instance of the pod to the second data processing system;
   instantiating, by the orchestrator, a replica for the volume in storage of the second data processing system; and
   initiating, by the orchestrator, operation of the new instance of the pod using the replica for the volume.

9. The non-transitory machine-readable medium of claim 8, wherein the operations further comprise:
   instantiating, by the orchestrator, a second replica for the volume in storage of the second data processing system,
   wherein the replica and the second replica store an erasure coded version of data of the volume, and the operation of the new instance of the pod is also initiating using the second replica for the volume.

10. The non-transitory machine-readable medium of claim 8, wherein instantiating the replica for the volume comprises:
    initiating, by the orchestrator, a transfer of at least a portion of data of the volume to the second data processing system via a remote direct memory access data transfer.

11. The non-transitory machine-readable medium of claim 8, wherein selecting the second data processing system comprises:
    discriminating a portion of data processing systems from all data processing systems available to host the pods based on data access patterns for all instances of the volume; and
    selecting the second data processing system from the data processing systems based on computing resource availability.

12. The non-transitory machine-readable medium of claim 8, wherein the new instance of the pod comprises a container, and the container hosts an application that provides a portion of computer implemented services provided by the pod.

13. The non-transitory machine-readable medium of claim 12, wherein during operation of the new instance of the pod, the application uses data stored in the replica of the volume to provide the computer implemented services, and the operation of the new instance of the pod does not use data of the volume.

14. The non-transitory machine-readable medium of claim 8, wherein the second data processing system does not host any instance of the pod that have used any replicas of the volume.

15. A data processing system, comprising:
    a processor; and
    a memory coupled to the processor to store instructions, which when executed by the processor, cause the processor to perform operations for providing computer implemented services using pods of containers, the operations comprising:
    obtaining a data access pattern for a volume used by an instance of a pod of the pods;
    obtaining a request for a new instance of the pod;
    identifying, based on the request, a first data processing system that hosts the volume;
    selecting a second data processing system that does not host the volume or any instances of the pod that have utilized the volume;

deploying the new instance of the pod to the second data processing system;

instantiating a replica for the volume in storage of the second data processing system; and initiating operation of the new instance of the pod using the replica for the volume.

16. The data processing system of claim 15, wherein the operations further comprise:

instantiating a second replica for the volume in storage of the second data processing system, wherein the replica and the second replica store an erasure coded version of data of the volume, and the operation of the new instance of the pod is also initiating using the second replica for the volume.

17. The data processing system of claim 15, wherein instantiating the replica for the volume comprises:

initiating a transfer of at least a portion of data of the volume to the second data processing system via a remote direct memory access data transfer.

18. The data processing system of claim 15, wherein selecting the second data processing system comprises:

discriminating a portion of data processing systems from all data processing systems available to host the pods based on data access patterns for all instances of the volume; and selecting the second data processing system from the data processing systems based on computing resource availability.

19. The data processing system of claim 15, wherein the new instance of the pod comprises a container, and the container hosts an application that provides a portion of computer implemented services provided by the pod.

20. The data processing system of claim 19, wherein during operation of the new instance of the pod, the application uses data stored in the replica of the volume to provide the computer implemented services, and the operation of the new instance of the pod does not use data of the volume.

* * * * *